(12) United States Patent
Van Der Meulen et al.

(10) Patent No.: US 12,240,203 B2
(45) Date of Patent: Mar. 4, 2025

(54) METHOD FOR PRODUCING A COMPOSITE PANE WITH A FUNCTIONAL ELEMENT

(71) Applicant: SAINT-GOBAIN GLASS FRANCE, Courbevoie (FR)

(72) Inventors: Uwe Van Der Meulen, Nideggen (DE); Nino Tings, Eschweiler (DE); Raphaela Kannengiesser, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 48 days.

(21) Appl. No.: 17/767,506

(22) PCT Filed: Oct. 5, 2020

(86) PCT No.: PCT/EP2020/077800
§ 371 (c)(1),
(2) Date: Apr. 8, 2022

(87) PCT Pub. No.: WO2021/069354
PCT Pub. Date: Apr. 15, 2021

(65) Prior Publication Data
US 2024/0075714 A1    Mar. 7, 2024

(30) Foreign Application Priority Data
Oct. 10, 2019   (EP) ..................... 19202366

(51) Int. Cl.
*B32B 17/12*   (2006.01)
*B32B 3/10*   (2006.01)
(Continued)

(52) U.S. Cl.
CPC .......... *B32B 17/10045* (2013.01); *B32B 3/10* (2013.01); *B32B 7/12* (2013.01);
(Continued)

(58) Field of Classification Search
CPC ........ B32B 17/10045; B32B 17/10431; B32B 17/1055; B32B 17/10816; B32B 3/10; B32B 7/12
See application file for complete search history.

(56) References Cited

U.S. PATENT DOCUMENTS

2009/0176101 A1   7/2009  Greenall et al.
2016/0325529 A1*  11/2016  Linthout ................ B60Q 3/208
(Continued)

FOREIGN PATENT DOCUMENTS

CN    101454156 A    6/2009
CN    109073928 A    12/2018
(Continued)

OTHER PUBLICATIONS

International Search Report as issued in International Patent Application No. PCT/EP2020/077800, dated Dec. 8, 2020.
(Continued)

*Primary Examiner* — Daniel McNally
(74) *Attorney, Agent, or Firm* — Pillsbury Winthrop Shaw Pittman LLP

(57) ABSTRACT

A method for producing a composite pane includes arranging a first, second and third thermoplastic intermediate layers in full surface contact one above the other, the first, second and third thermoplastic intermediate layers; joining the first, second and third thermoplastic intermediate layers to form a preliminary composite; removing the third thermoplastic intermediate layer from certain regions to form an aperture; forming a layered stack by inserting a functional element into the aperture in the third thermoplastic intermediate layer; arranging the layered stack between a first and second pane; and the joining the first and second panes by lamination via the layered stack. The functional element has a thickness of ≥50 μm. The third thermoplastic intermediate layer has a thickness that substantially corresponds to the (Continued)

Figure 1:
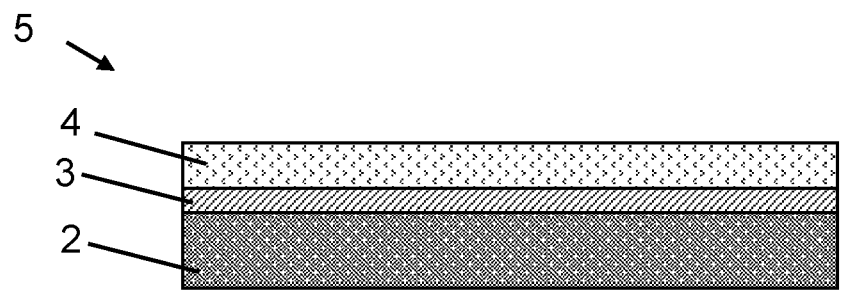

thickness of the functional element. The outer dimensions of the aperture substantially correspond to the outer dimensions of the functional element.

21 Claims, 6 Drawing Sheets

(51) Int. Cl.
  *B32B 7/12* (2006.01)
  *B32B 17/10* (2006.01)
  *B32B 38/10* (2006.01)
(52) U.S. Cl.
  CPC .... *B32B 17/10431* (2013.01); *B32B 17/1055* (2013.01); *B32B 17/10816* (2013.01); *B32B 38/10* (2013.01); *B32B 2250/04* (2013.01); *B32B 2307/102* (2013.01); *B32B 2307/51* (2013.01); *B32B 2307/7376* (2023.05)

(56) References Cited

U.S. PATENT DOCUMENTS

2018/0370195 A1* 12/2018 Laluet ................ G02B 27/0101
2019/0134954 A1 5/2019 Bauerle et al.

FOREIGN PATENT DOCUMENTS

| CN | 109952220 A | 6/2019 | |
|---|---|---|---|
| CN | 110177684 A | 8/2019 | |
| DE | 20 2019 100577 U1 | 3/2019 | |
| EP | 2 010 385 B1 | 8/2009 | |
| WO | WO-2007122429 A1 * | 11/2007 | ............. B32B 17/10 |
| WO | WO 2014/135467 A1 | 9/2014 | |
| WO | WO-2018197235 A1 * | 11/2018 | ....... B32B 17/10036 |
| WO | WO 2019/025178 A1 | 2/2019 | |
| WO | WO-2019150038 A1 * | 8/2019 | ....... B32B 17/10036 |
| WO | WO 2019/166155 A1 | 9/2019 | |
| WO | WO 2020/020614 A1 | 1/2020 | |

OTHER PUBLICATIONS

Notice of Attending to Patent Registration as issued in Chinese Patent Application No. 202080003790.2, dated Aug. 15, 2024.

* cited by examiner

METHOD FOR PRODUCING A COMPOSITE PANE WITH A FUNCTIONAL ELEMENT

CROSS-REFERENCE TO RELATED APPLICATIONS

This application is the U.S. National Stage of PCT/EP2020/077800, filed Oct. 5, 2020, which in turn claims priority to European patent application number 19202366.1 filed Oct. 10, 2019. The content of these applications are incorporated herein by reference in their entireties.

The invention relates to a method for producing a composite pane with a functional element, a composite pane produced by means of such a method, and the use thereof.

Composite panes with additional functionality have become increasingly popular and sought after in recent years. Typically, additional functionality is provided by using at least one layer of coated or tinted glass in a composite glass structure to provide, for example, heat or UV reflective properties. However, functionality can also be achieved by laminating a functional element, i.e., an insert element having a functionality, into a composite pane.

The functional element is usually smaller in terms of its external dimensions than the resulting composite pane, for example, in order to protect the functional element against moisture and environmental influences. Usually, in order to avoid air inclusions between two intermediate layers during lamination, the functional element is surrounded in a frame-like manner by an additional intermediate layer that has an aperture to accommodate the functional element.

EP 2 010 385 B1, US 2009/0176101 A1, and WO 2014/135467 A1 disclose composite panes with a functional element that is surrounded in a frame-like manner by an intermediate layer.

Such composite panes can be produced by a method by, in a first step, cutting an aperture in a first intermediate layer; in a second step, the first intermediate layer and a functional element arranged in the aperture are arranged between two intermediate layers; in a third step, the three intermediate layers with the functional element surrounded in a frame-like manner by the first intermediate layer are arranged between two panes; and in a fourth step, the two panes are laminated via the intermediate layers.

WO 2019150038 A1 discloses a composite pane with a functional element. US 2016/325529 A1 discloses a composite pane that is joined together via six intermediate layers, wherein a functional element is surrounded in a frame-like manner by one of the intermediate layers.

The object of the present invention is to provide an improved method for producing a composite pane having a functional element and to provide an improved composite pane having a functional element.

The object of the present invention is accomplished by a method according to independent claim 1 and by a composite pane according to independent claim 14. Preferred embodiments emerge from the subclaims.

The method according to the invention for producing a composite pane comprises at least the following steps:
  a) Arranging a first thermoplastic intermediate layer, a second thermoplastic intermediate layer, and a third thermoplastic intermediate layer in full surface contact one above the other;
  b) Joining the first thermoplastic intermediate layer, the second thermoplastic intermediate layer, and the third thermoplastic intermediate layer to form a preliminary composite;
  c) Removing the third thermoplastic intermediate layer in certain regions to form an aperture;
  d) Inserting a functional element into the aperture in the third thermoplastic intermediate layer to form a layered stack;
  e) Arranging the layered stack between a first pane and a second pane;
  f) Joining the first pane and the second pane via the layered stack by lamination.

It goes without saying that the steps a) through f) of the method are carried out in the order indicated. Thus, step c), i.e., the removal of the third thermoplastic intermediate layer in certain regions to form an aperture, occurs only after step b), i.e., the joining of the first thermoplastic intermediate layer, the second thermoplastic intermediate layer, and the third thermoplastic intermediate layer to form a preliminary composite. Thus, in the method according to the invention, the first thermoplastic intermediate layer, the second thermoplastic intermediate layer, and the third thermoplastic intermediate layer are first joined to form a preliminary composite; and then, the third thermoplastic intermediate layer is removed from certain regions to form an aperture.

Thus, according to the invention, there is a method for producing a composite pane, wherein the method has the following sequence of steps:
  a) Arranging a first thermoplastic intermediate layer, a second thermoplastic intermediate layer, and a third thermoplastic intermediate layer in full surface contact one above the other;
  b) Joining the first thermoplastic intermediate layer, the second thermoplastic intermediate layer, and the third thermoplastic intermediate layer to form a preliminary composite;
  c) Removing the third thermoplastic intermediate layer in certain regions to form an aperture;
  d) Inserting a functional element into the aperture in the third thermoplastic intermediate layer to form a layered stack;
  e) Arranging the layered stack between a first pane and a second pane;
  f) Joining the first pane and the second pane via the layered stack by lamination.

According to the invention, the functional element has a thickness of ≥50 μm (micrometers), i.e., a thickness greater than or equal to 50 μm, and the third thermoplastic intermediate layer has a thickness that substantially corresponds to the thickness of the functional element, i.e., the functional element and the third thermoplastic intermediate layer have substantially the same thickness.

"Substantially the same thickness" means that the thicknesses deviate from one another by a maximum of 50 μm.

According to the invention, the outer dimensions of the aperture correspond substantially to the outer dimensions of the functional element, i.e., the aperture and the functional element have substantially the same geometry.

"Substantially the same outer dimensions" means that the outer dimensions deviate from one another by a maximum of 1 mm, preferably by a maximum of 50 μm.

In the context of the invention, "functional element" means an insert element having a functionality. It goes without saying that a functional element can also have more than one functionality.

In step e), the layered stack is arranged between a first pane and a second pane. It is also possible for the preliminary composite of step b) to be placed on a first pane; then, step c) and step d) occur; and then, subsequently, in step e), a second pane is placed on the layered stack. It is likewise possible for the preliminary composite having the aperture in the third thermoplastic intermediate layer to be placed on a first pane after step c); then, step d) occurs; and then, subsequently, in step e), a second pane is placed on the layered stack.

In a preferred embodiment of the method according to the invention, the method includes, in step d) for forming the layered stack, as an additional step, the placement, in full surface contact, of a layer having adhesive and/or thermoplastic properties on the functional element and the third thermoplastic intermediate layer. Thus, in this embodiment the layered stack also includes a layer having adhesive and/or thermoplastic properties, which had been placed in full surface contact on the third thermoplastic intermediate layer and the functional element arranged in the aperture in the third thermoplastic intermediate layer.

Alternatively, or additionally, in a preferred embodiment of the method according to the invention, a functional element can be used that includes a thin layer having adhesive and/or thermoplastic properties that forms a surface of the functional element. In this embodiment, in the method according to the invention, the functional element is inserted into the aperture in the third thermoplastic intermediate layer such that the thin layer is not arranged directly adjacent the second thermoplastic intermediate layer.

The thin layer having adhesive and/or thermoplastic properties can, for example, be bonded to the rest of the functional element or else loosely placed thereon.

According to the invention, there is, consequently, also a method wherein at least a) a first thermoplastic intermediate layer, a second thermoplastic intermediate layer, and a third thermoplastic intermediate layer are arranged in full surface contact one above the other;
b) the first thermoplastic intermediate layer, the second thermoplastic intermediate layer, and the third thermoplastic intermediate layer are joined to forma preliminary composite;
c) the third thermoplastic intermediate layer is removed from certain regions to form an aperture;
d) a layered stack is formed, by inserting a functional element into the aperture in the third thermoplastic intermediate layer and placing a layer having adhesive and/or thermoplastic properties in full surface contact on the functional element and the third thermoplastic intermediate layer or by inserting a functional element that includes a thin layer having adhesive and/or thermoplastic properties that forms a surface of the functional element into the aperture in the third thermoplastic intermediate layer such that the thin layer is not arranged adjacent the second thermoplastic intermediate layer;
e) the layered stack is arranged between a first pane and a second pane;
f) the first pane and the second pane are joined via the layered stack by lamination;
wherein
the functional element has a thickness of 50 μm and the third thermoplastic intermediate layer has a thickness that substantially corresponds to the thickness of the functional element, and the dimensions of the aperture substantially correspond to the dimensions of the functional element.

It goes without saying that the steps a) through f) of the method are carried out in the order indicated.

According to the invention, there is also a method, wherein at least a) a first thermoplastic intermediate layer, a second thermoplastic intermediate layer, and a third thermoplastic intermediate layer are arranged in full surface contact one above the other;
b) the first thermoplastic intermediate layer, the second thermoplastic intermediate layer, and the third thermoplastic intermediate layer are joined to forma preliminary composite;
c) the third thermoplastic intermediate layer is removed from certain regions to form an aperture;
d) a layered stack is formed by inserting a functional element that includes a thin layer having adhesive and/or thermoplastic properties that forms a surface of the functional element into the aperture in the third thermoplastic intermediate layer such that the thin layer is not arranged adjacent the second thermoplastic intermediate layer and placing a layer having adhesive and/or thermoplastic properties in full surface contact on the functional element and the third thermoplastic intermediate layer;
e) the layered stack is arranged between a first pane and a second pane;
f) the first pane and the second pane are joined via the layered stack by lamination;
wherein
the functional element has a thickness of 50 μm and the third thermoplastic intermediate layer has a thickness that substantially corresponds to the thickness of the functional element, and the dimensions of the aperture substantially correspond to the dimensions of the functional element.

It goes without saying that the steps a) through f) of the method are carried out in the order indicated.

In a preferred embodiment of the method according to the invention, the second thermoplastic intermediate layer has a thickness of 20 μm to 150 μm, preferably of 30 μm to 90 μm, particularly preferably of 50 μm to 75 μm, and most particularly preferably of 50 μm.

The functional element has, for example, a thickness of 50 μm to 1.0 mm. Preferably, the functional element can be 50 μm to 300 μm thick, particularly preferably 50 μm to 100 μm thick.

The functional element can be or include, for example, a film that reflects in the infrared range, in the visible range, and/or in the UV range or a film that absorbs in the infrared range, in the visible range, and/or in the UV range or a film with a scattering effect or a holographic HUD film. The functional element can also be or include, for example, a controllable functional element, in particular a PDLC, an SPD, an LC, an electrochromic, or an electroluminescent functional element. Such films and such controllable functional elements are commercially available.

Preferably, the functional element is a film that reflects in the infrared range, in the visible range, and/or in the UV range or a film that absorbs in the infrared range, in the visible range, and/or in the UV range or a film with a scattering effect or a holographic HUD film or the functional element includes such a film. Particularly preferably, the functional element is a film that reflects in the infrared range, i.e., a so-called "XIR film", or the functional element includes such a film.

The mentioned films that reflect in the infrared range, in the visible range, and/or in the UV range or films that absorb in the infrared range, in the visible range, and/or in the UV range or films with a scattering effect or holographic HUD films and their mode of functioning are known per se to the person skilled in the art such that a detailed description can be dispensed with here.

When the functional element is a film that reflects in the infrared range, in the visible range, and/or in the UV range or a film that absorbs in the infrared range, in the visible range, and/or in the UV range or a film with a scattering effect or a holographic HUD film or includes such a film, this film preferably has a thickness of 50 μm to 300 μm, in particular of 50 μm to 100 μm for example, 50 μm or 100 μm.

When the functional element is or includes a controllable functional element, this preferably has a thickness of 0.2 mm to 1.0 mm, in particular of 0.3 mm to 0.7 mm, for example, 0.4 mm.

Preferably, the first thermoplastic intermediate layer, the second thermoplastic intermediate layer, and the third thermoplastic intermediate layer, independently of one another, contain a thermoplastic polymer, particularly preferably at least polyvinyl butyral (PVB), ethylene vinyl acetate (EVA), and/or polyurethane (PU), most particularly preferably polyvinyl butyral (PVB).

In one embodiment of the method according to the invention, the layered stack includes a layer having adhesive and/or thermoplastic properties lying in full surface contact on the functional element and the third thermoplastic intermediate layer, and the layer having adhesive and/or thermoplastic properties preferably contains a thermoplastic polymer, preferably at least polyvinyl butyral (PVB), ethylene vinyl acetate (EVA), and/or polyurethane (PU), particularly preferably polyvinyl butyral (PVB). Optionally, the layer having adhesive and/or thermoplastic properties can have a wedge-shaped cross-section. The wedge angle of a wedge-shaped layer having adhesive and/or thermoplastic properties is preferably 0.1 mrad to 1.0 mrad, particularly preferably 0.15 mrad to 0.75 mrad, most particularly preferably 0.3 mrad to 0.7 mrad.

In an alternative embodiment of the method according to the invention, the layered stack comprises a layer having adhesive and/or thermoplastic properties lying in full surface contact on the functional element and the third thermoplastic intermediate layer; and the layer having adhesive and/or thermoplastic properties is an optically transparent adhesive, for example, a so-called optical clear adhesive (OCA).

In another embodiment of the method according to the invention, the functional element comprises a thin layer having adhesive and/or thermoplastic properties, which forms a surface of the functional element, and the functional element is inserted into the aperture in the third thermoplastic intermediate layer such that the thin layer is not arranged directly adjacent the second thermoplastic intermediate layer, and the thin layer having adhesive and/or thermoplastic properties contains a thermoplastic polymer, preferably at least polyvinyl butyral (PVB), ethylene vinyl acetate (EVA), and/or polyurethane (PU), particularly preferably polyvinyl butyral (PVB) and preferably has a maximum thickness of 50 μm.

In another alternative embodiment of the method according to the invention, the functional element includes a thin layer having adhesive and/or thermoplastic properties, which forms a surface of the functional element, and the functional element is inserted into the aperture in the third thermoplastic intermediate layer such that the thin layer is not arranged directly adjacent the second thermoplastic intermediate layer, and the thin layer having adhesive and/or thermoplastic properties is an optically transparent adhesive, for example, a so-called optical clear adhesive (OCA) and preferably has a maximum thickness of 50 μm.

The first thermoplastic intermediate layer can, for example, be formed by a single thermoplastic film. The first thermoplastic intermediate layer can also be implemented as a 2-ply, 3-ply, or multi-ply film stack and thus consist of two, three, or more thermoplastic layers. The first thermoplastic intermediate layer can also be implemented as an intermediate layer with acoustically damping properties.

The first thermoplastic intermediate layer preferably has a constant thickness. In one embodiment, the first thermoplastic intermediate layer has a wedge-shaped cross-section. The wedge angle of a wedge-shaped first thermoplastic intermediate layer is preferably 0.1 mrad to 1.0 mrad, particularly preferably 0.15 mrad to 0.75 mrad, most particularly preferably 0.3 mrad to 0.7 mrad.

The second thermoplastic intermediate layer can, for example, be formed by a single thermoplastic film. The second thermoplastic intermediate layer can also be implemented as a 2-ply, 3-ply, or multi-ply film stack and thus consist of two, three, or more thermoplastic layers.

The third thermoplastic intermediate layer can, for example, be formed by a single thermoplastic film. The third thermoplastic intermediate layer can also be implemented as a 2-ply, 3-ply, or multi-ply film stack and thus consist of two, three, or more thermoplastic layers.

In one embodiment, the third thermoplastic intermediate layer consists of at least two thermoplastic layers. In another embodiment, the third thermoplastic intermediate layer consists of exactly two thermoplastic layers. It goes without saying that the third thermoplastic intermediate layer can also consist of only a single thermoplastic layer.

In one embodiment of a method according to the invention, the first thermoplastic intermediate layer contains at least 3 wt.-%, preferably at least 5 wt.-%, particularly preferably at least 20 wt.-%, even more preferably at least 30 wt.-%, and, in particular, at least 40 wt.-% of a plasticizer. The plasticizer preferably contains or consists of triethylene glycol-bis-(2-ethylhexanoate).

Plasticizers are chemicals that make plastics softer, more flexible, smoother, and/or more elastic. They shift the thermoelastic range of plastics to lower temperatures such that the plastics have the desired more elastic properties in the range of the temperature of use. Other preferred plasticizers are carboxylic acid esters, in particular low-volatility carboxylic acid esters, fats, oils, soft resins, and camphor. Other plasticizers are preferably aliphatic diesters of tri- or tetraethylene glycol. Particularly preferably used as plasticizers are 3G7, 3G8, or 4G7, where the first digit indicates the number of ethylene glycol units and the last digit indicates the number of carbon atoms in the carboxylic acid portion of the compound. Thus, 3G8 represents triethylene glycol-bis-(2-ethyl hexanoate), in other words, a compound of the formula $C_4H_9CH(CH_2CH_3)CO(OCH_2CH_2)_3O_2CCH(CH_2CH_3)C_4H_9$.

In a preferred embodiment of a method according to the invention, the first thermoplastic intermediate layer contains plasticizers and the second thermoplastic intermediate layer and the third thermoplastic intermediate layer contain, independently of one another, a lower proportion of plasticizers than the first thermoplastic intermediate layer or are free of plasticizers. In this way, the removal of the third thermoplastic intermediate layer in certain regions to form an aperture is simplified, since the adhesion of the third thermoplastic intermediate layer to the second thermoplastic intermediate layer is thus lower than the adhesion of the second thermoplastic intermediate layer to the first thermoplastic intermediate layer.

In another preferred embodiment of a method according to the invention, the first thermoplastic intermediate layer contains plasticizers, the third thermoplastic intermediate layer consists of at least two thermoplastic layers, and the second thermoplastic intermediate layer and the thermoplastic layer of the third thermoplastic intermediate layer, which is arranged in the composite pane directly adjacent the second thermoplastic intermediate layer, contain, independently of one another, a lower proportion of plasticizers than the first thermoplastic intermediate layer or are free of plasticizers. In this way, the removal of the third thermoplastic intermediate layer from certain regions to form an aperture is simplified, since the adhesion of that thermoplastic layer of the third thermoplastic intermediate layer, which is arranged directly adjacent the second thermoplastic layer, to the second thermoplastic intermediate layer is thus lower than the adhesion of the second thermoplastic intermediate layer to the first thermoplastic intermediate layer.

A composite pane according to the invention produced by means of the method according to the invention can, for example, be the windshield or the roof panel of a vehicle or another vehicle glazing, for example, a partition pane in a vehicle, preferably in a rail vehicle or a bus. Alternatively, the composite pane can be an architectural glazing, for example, in an exterior façade of a building or a partition in the interior of a building.

A composite pane produced by a method according to the invention can be bent in one or more spatial directions, as is customary for motor vehicle panes, with typical radii of curvature in the range from approx. 10 cm to approx. 40 m. In this case, correspondingly curved pales are used as the first pane and the second pane in the method according to the invention. However, the composite pane can also be planar, for example, when it is intended as a pane for buses, trains, or tractors.

The terms "first pane" and "second pane" arbitrarily describe two different panes. In particular, the first pane can be an outer pane and the second pane, an inner pane; or, alternatively, the first pane can be an inner pane and the second pane, an outer pane.

In the context of the invention, if the composite pane is intended, in a window opening of a vehicle or a building, to separate an interior space from the external environment, "inner pane" refers to the pane facing the interior (vehicle interior). "Outer pane" refers to the pane facing the external environment. However, the invention is not restricted to this.

The first thermoplastic intermediate layer, the second thermoplastic intermediate layer, and the third thermoplastic intermediate layer usually have the same outer dimensions as the first pane and the second pane.

In a preferred embodiment of the method, the functional element is or includes a film that reflects in the infrared range, i.e., an XIR film. This is a carrier film with an infrared-light-reflecting coating arranged thereon.

Such a carrier film preferably contains polyethylene terephthalate (PET), polyethylene (PE), polyamide (PA), polymethyl methacrylate (PMMA), and/or mixtures and/or copolymers and/or derivatives thereof. Particularly preferably, the carrier film is a PET film. The carrier film can also contain cellulose acetate, also referred to as "triacetate". Such a film containing cellulose acetate is also referred to as "TAC film". The carrier film preferably has a thickness of 5 μm (micrometers) to 500 μm, particularly preferably 10 μm to 200 μm, for example, 50 μm or 75 μm or 100 μm. The thickness of the infrared-radiation-reflecting coating is at most 1 μm, preferably significantly less.

In another embodiment, the functional element is a film with a scattering effect or the functional element includes a film with a scattering effect. This is a carrier film with liquid crystals arranged on the surface.

Such a carrier film preferably contains polyethylene terephthalate (PET), polyethylene (PE), polyamide (PA), polymethyl methacrylate (PMMA), and/or mixtures and/or copolymers and/or derivatives thereof. Particularly preferably, the carrier film is a PET film. The carrier film can also contain cellulose acetate, also referred to as "triacetate". Such a film containing cellulose acetate is also referred to as "TAC film". The carrier film preferably has a thickness of 5 μm (micrometers) to 500 μm, particularly preferably 10 μm to 200 μm, for example, 50 μm or 75 m or 100 μm.

In another embodiment of the method, the functional element is or includes a controllable functional element. A controllable functional element typically comprises an active layer between two surface electrodes. The active layer has the controllable optical properties that can be controlled via the voltage applied to the surface electrodes. The surface electrodes and the active layer are typically arranged substantially parallel to the surfaces of the first pale and the second pane. The surface electrodes are electrically connected to an external voltage source in a manner known per se. The electrical contacting is implemented by suitable connecting cables, for example, foil conductors that are, optionally, connected to the surface electrodes via so-called "bus bars", for example, strips of an electrically conductive material or electrically conductive imprints.

The surface electrodes are preferably designed as transparent, electrically conductive layers. The surface electrodes preferably contain at least a metal, a metal alloy, or a transparent conducting oxide (TCO). The surface electrodes can contain, for example, silver, gold, copper, nickel, chromium, tungsten, indium tin oxide (ITO), gallium-doped or aluminum-doped zinc oxide, and/or fluorine-doped or antimony-doped tin oxide. The surface electrodes preferably have a thickness of 10 nm to 2 μm, particularly preferably of 20 nm to 1 μm (micrometers), most particularly preferably of 30 nm to 500 nm.

In addition to the active layer and the surface electrodes, a controllable functional element can have other layers known per se, for example, barrier layers, blocking layers, antireflection layers, protective layers, and/or smoothing layers.

A controllable functional element is preferably present as a multilayer film with two outer carrier films. In such a multilayer film, the surface electrodes and the active layer are arranged between the two carrier films. Here, "outer carrier film" means that the carrier films form the two surfaces of the multilayer film. The controllable functional element can thus be provided as a laminated film that can be advantageously processed. The controllable functional element is advantageously protected by the carrier films against damage, in particular, against corrosion. The multilayer film contains, in the order indicated, at least one carrier film, one surface electrode, one active layer, one additional surface electrode, and one additional carrier film. The carrier film carries, in particular, the surface electrodes and gives a liquid or soft active layer the necessary mechanical stability.

The carrier films preferably contain at least one thermoplastic polymer, particularly preferably low-plasticizer or plasticizer-free polyethylene terephthalate (PET). This is particularly advantageous in terms of the stability of the multilayer film. However, the carrier films can also contain or consist of other low-plasticizer or plasticizer-free polymers, for example, ethylene vinyl acetate (EVA), polypropylene, polycarbonate, polymethyl methacrylate, polyacrylate, polyvinyl chloride, polyacetate resin, casting resins, acrylates, fluorinated ethylene propylenes, polyvinyl fluoride, and/or ethylene tetrafluoroethylene. The thickness of each carrier film is preferably from 0.1 mm to 1 mm, particularly preferably from 0.1 mm to 0.2 mm.

Typically, the carrier films have in each case an electrically conductive coating that faces the active layer and acts as a surface electrode.

In another advantageous embodiment of the method according to the invention, the functional element is or includes a PDLC functional element (polymer dispersed liquid crystal). The active layer of a PDLC functional element contains liquid crystals that are embedded in a polymer matrix. When no voltage is applied to the surface electrodes, the liquid crystals are aligned in a disorderly manner, resulting in strong scattering of the light passing through the active layer. When a voltage is applied to the surface electrodes, the liquid crystals align themselves in a common direction and the transmittance of light through the active layer is increased.

In principle, however, it is also possible to use other types of controllable functional elements, for example, electrochromic or electroluminescent functional elements or LC functional elements (liquid crystal) or guest-host systems or SPD functional elements (suspended particle device). The controllable functional elements mentioned and their mode of operation are known per se to the person skilled in the art such that a detailed description can be dispensed with here.

Functional elements as multilayer films are commercially available. The functional element to be integrated is typically cut in the desired shape and size from a multilayer film of larger dimensions. This can be done mechanically, for example, with a knife. In one embodiment, the cutting is done using a plotter equipped with a cutting blade. In another embodiment, the cutting is done by a laser. It has been demonstrated that, in this case, the side edge is more stable than with mechanical cutting. With mechanically cut side edges, there can be a risk that the material will pull back, which is visually conspicuous and adversely affects the aesthetics of the pane.

The first pane and the second pane are preferably made of glass, particularly preferably of soda lime glass, as is customary for window panes. The panes can, however, also be made of other types of glass, for example, quartz glass, borosilicate glass, or aluminosilicate glass, or rigid clear plastics, for example, polycarbonate or polymethyl methacrylate. The panes can be clear, or also tinted or colored.

The first pane and the second pane can have suitable coatings known per se, for example, antireflection coatings, nonstick coatings, anti-scratch coatings, photocatalytic coatings, electrically heatable coatings, solar protection coatings, and/or coatings that reduce the emission of long-wave thermal radiation (low-E coatings). Preferably, the antireflection coatings, anti-scratch coatings, and/or low-E coatings are applied to the outside of the first pane or the outside of the second pane. "The outside of the first pane" and "the outside of the second pane" means in each case that side of the pane that does not face in the direction of the functional element. "The inside of the first pane" and "the inside of the second pane" means in each case that side of the pane that faces in the direction of the functional element.

The thickness of the first pane and the second pane can vary widely and thus be adapted to the requirements of the individual case. The first pane and the second pane preferably have thicknesses of 0.5 mm to 5 mm, particularly preferably of 0.7 mm to 2.5 mm.

The thermoplastic intermediate layers can be clear, or also be tinted or colored in some regions or over their entire surface.

The side edges of the functional element are concealed in through-vision through the composite pane preferably by an opaque masking print on the first pane and/or the second pane and/or by an outer frame. Roof panels and windshields typically have a surrounding peripheral masking print made of an opaque enamel that serves, in particular, to protect the adhesive used for installation of the windshield against UV-radiation and to visually conceal it. This peripheral masking print is preferably used to also conceal the side edges of the functional element as well as the necessary electric connections when the composite pane has a controllable functional element. Preferably, both the first pane and the second pane have a masking print such that through-vision is prevented from both sides.

The functional element can have at least one aperture, for instance in the region of so-called "sensor windows" or "camera windows". These regions are provided to be equipped with sensors or cameras whose function would be impaired by a controllable functional element in the beam path, for example, rain sensors.

The functional element is preferably arranged over the entire width of the composite pane, minus an edge region on both sides having a width of, for example, 2 mm to 20 mm. The functional element also has a distance from the upper edge and the lower edge of the composite pane, preferably, for example, a distance of 2 mm to 20 mm. Particularly preferably, the functional element occupies a size of 70% to 90%, most particularly preferably 80% of the size of the composite pane. However, it is also possible for the functional element to be arranged only in a small sub-region of the composite pane, for example, to occupy only a size of 5% to 50%, preferably 5% to 10% of the size of the composite pane.

For the electrical contacting of a controllable functional element, electrical cables, in particular flat conductors, are connected to the surface electrodes and guided out of the layered stack via the side edge. The cables are, of course, connected before the lamination of the pane. The cables are preferably guided out between two intermediate layers in order to obtain complete enclosure of the flat conductors. In this way, the penetration of moisture is avoided.

Any imprints, for example, opaque masking prints or printed bus bars for the electrical contacting of a controllable functional element are preferably applied by screen printing.

The joining of the first thermoplastic intermediate layer, the second thermoplastic intermediate layer, and the third thermoplastic intermediate layer to form a preliminary composite can be done by deaeration in a vacuum bag under the action of temperature. For example, this can be done at a temperature of 50° C. to 100° C., preferably 80° C. to 100° C., and a vacuum of 900 mbar for a period of 10 to 30 minutes. Alternatively, the joining can also be done by passing over heated rollers with subsequent pressing in a roller press, for example, at a roller pressure of 1 to 4 bar and a temperature of 200° C. to 300° C.

The removal of the third thermoplastic intermediate layer from certain regions is carried out by cutting through the third thermoplastic intermediate layer along the outer dimensions of the aperture required for the functional element to be inserted. The cutting can be done, by means of a knife, a plotter, a laser, or by punching. Subsequently, the region around which the cut was made is removed. This can be done manually or by machine.

The lamination of the composite pane is preferably done under the action of heat, vacuum, and/or pressure. Lamination methods known per se can be used, for example, autoclave methods, vacuum bag methods, vacuum ring methods, calender methods, vacuum laminators, or combinations thereof.

The advantage of the method according to the invention is that as a result of the fact that the aperture in the third thermoplastic intermediate layer is not formed until after the third thermoplastic intermediate layer has been joined to the first and the second thermoplastic intermediate layer to forma preliminary composite, slippage of the third intermediate layer that has the aperture is prevented and exact positioning of the aperture and, thus, also of the functional element is ensured.

The invention also relates to a composite pane, in particular in the form of a windshield, produced by a method according to the invention.

It goes without saying that with regard to structure, dimensions, materials, and preferred embodiments of the first pane, the second pane, the intermediate layers, the layers, and the functional element, the statements made above for the method according to the invention apply equally to the composite pane according to the invention.

The invention also relates to the use of a composite pane according to the invention, i.e., a composite pane that was produced by a method according to the invention, as interior glazing or exterior glazing in a vehicle, a building, preferably as a vehicle pane, particularly preferably as a windshield, roof panel, side window, or rear window, most particularly preferably as a windshield or roof panel.

The various embodiments of the invention can be implemented individually or in any combinations. In particular, the features mentioned above and explained below can be used not only in the combinations indicated, but also in other combinations or in isolation, without departing from the scope of the present invention.

In the following, the invention is explained in greater detail with reference to drawings and exemplary embodiments. The drawings are schematic representations and not to scale. The drawings in no way restrict the invention.

Figure 2:
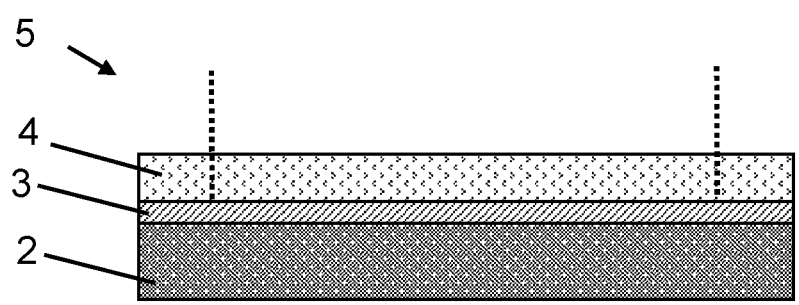
Figure 3:
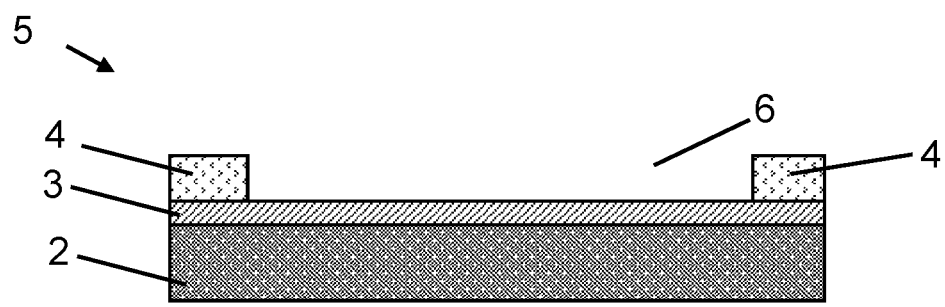
Figure 4:
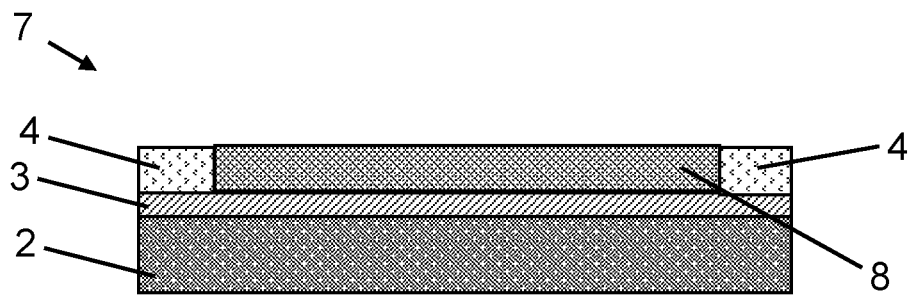
Figure 5:
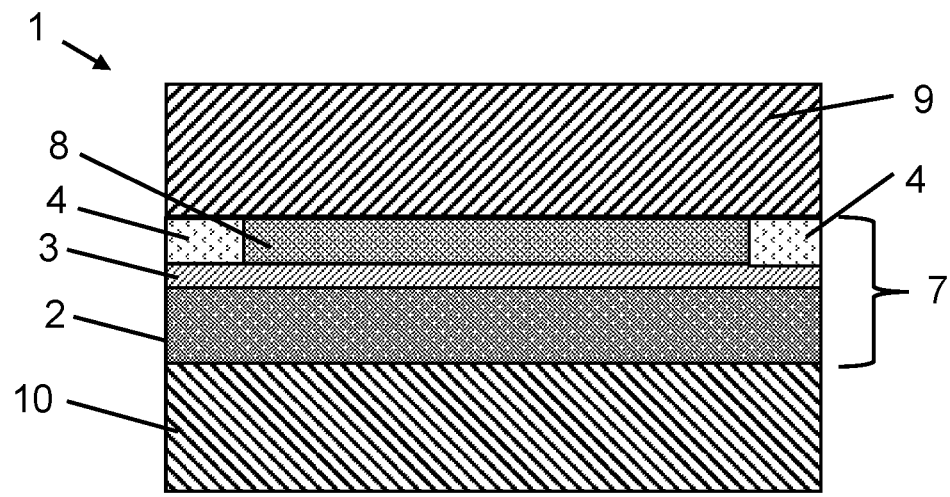
Figure 6:
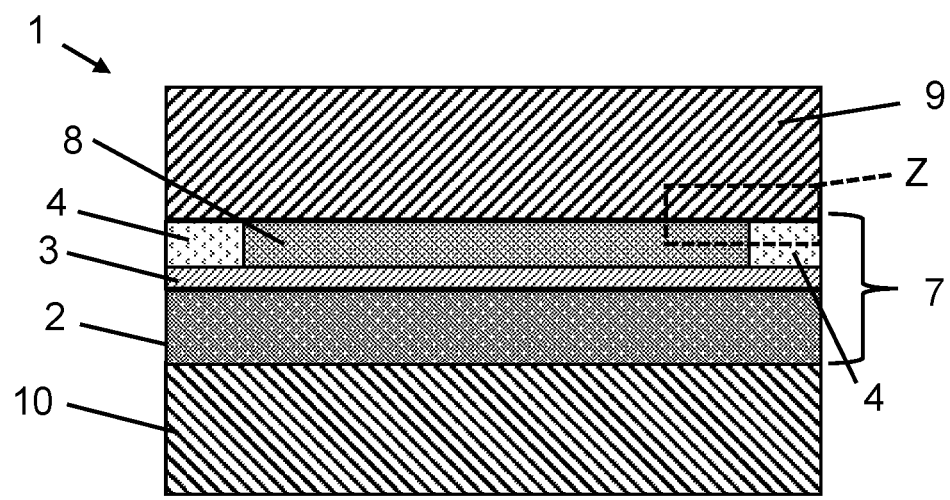
Figure 7:
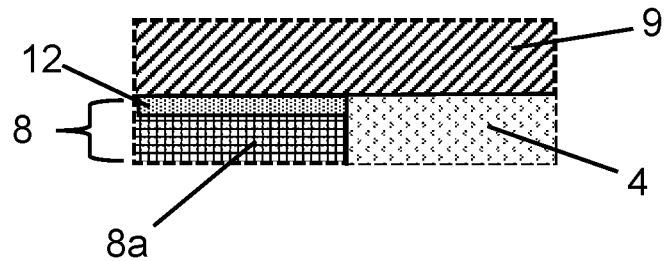
Figure 8:
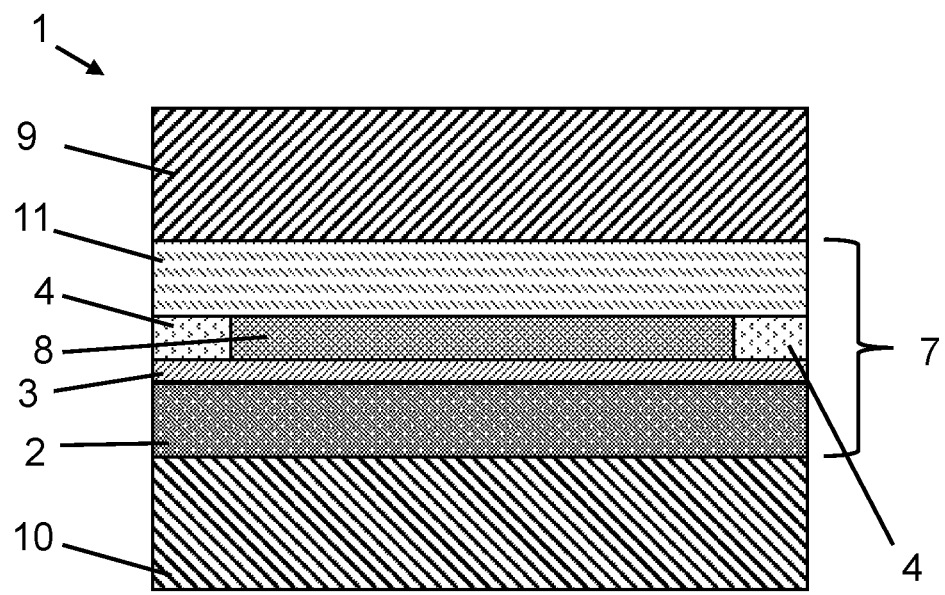
Figure 9:
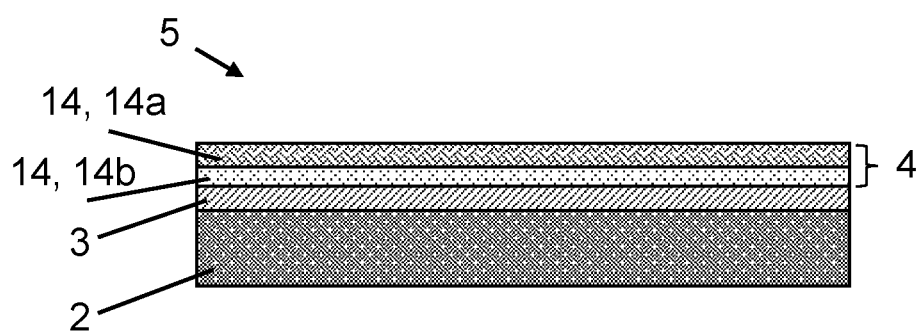
Figure 10:
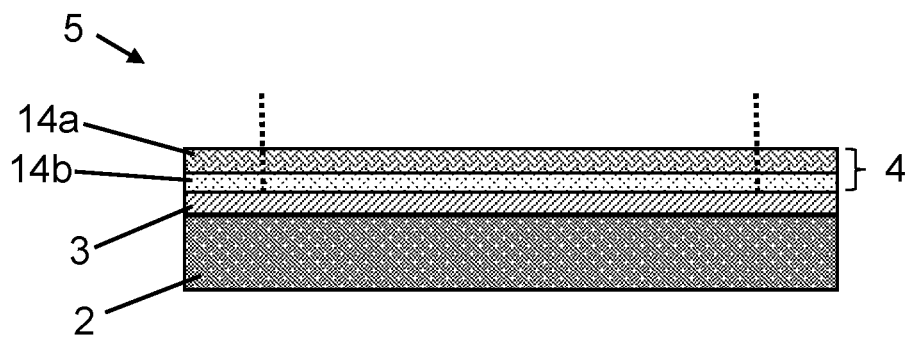
Figure 11:
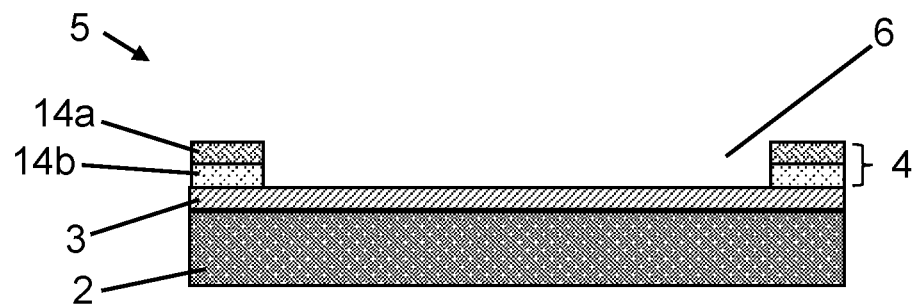
Figure 12:
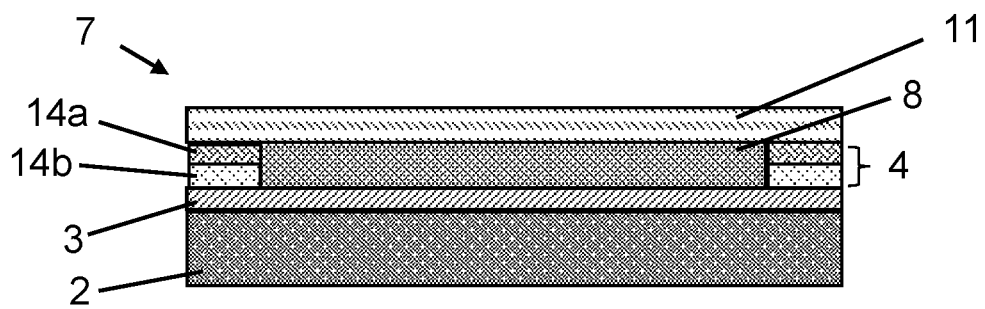
Figure 13:
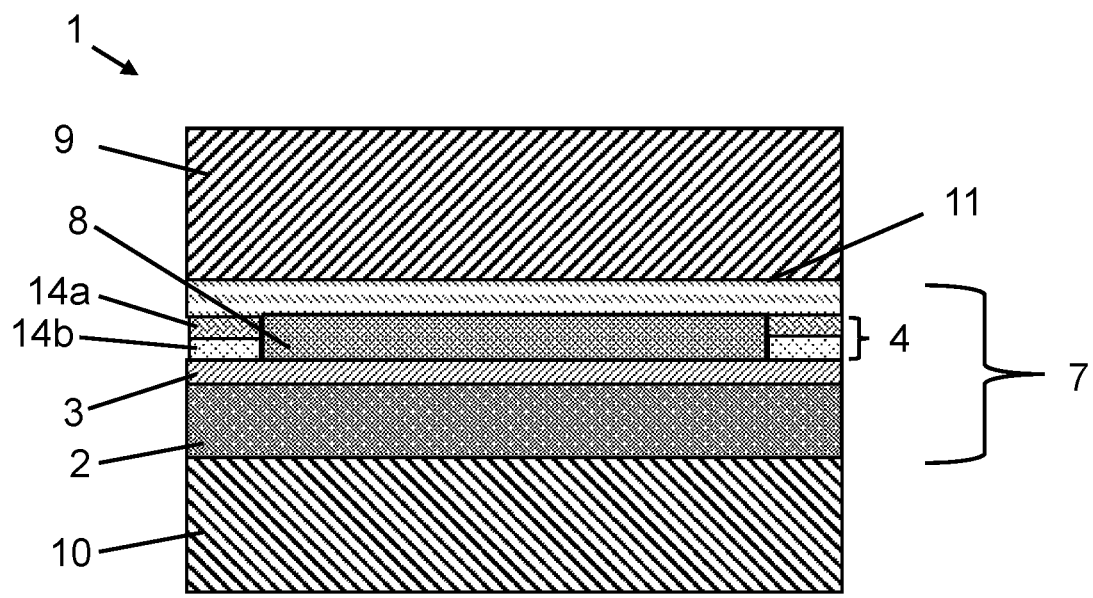
Figure 14:
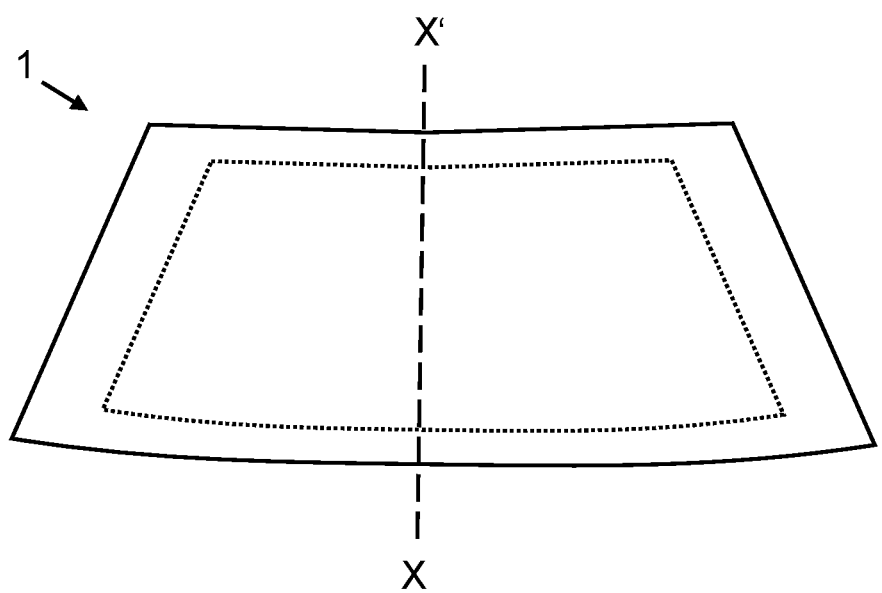
Figure 15:
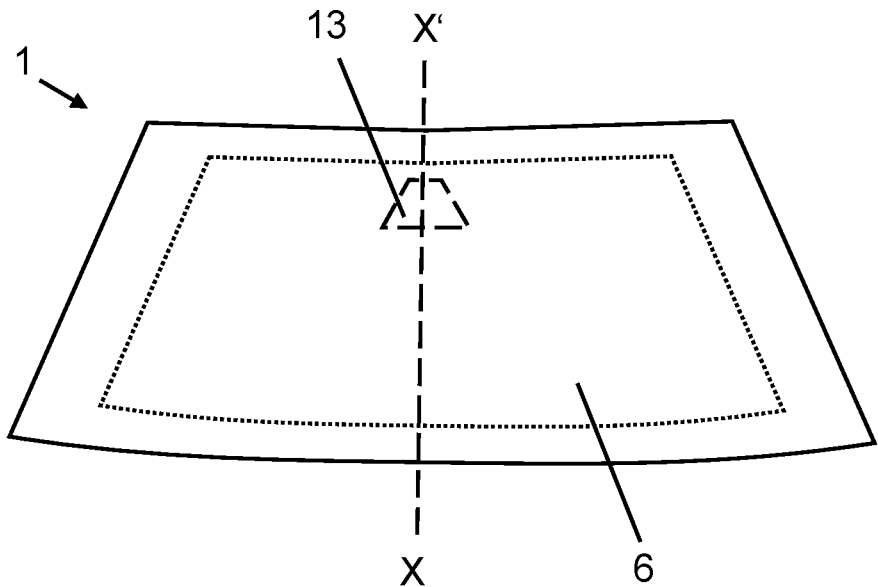
Figure 16:
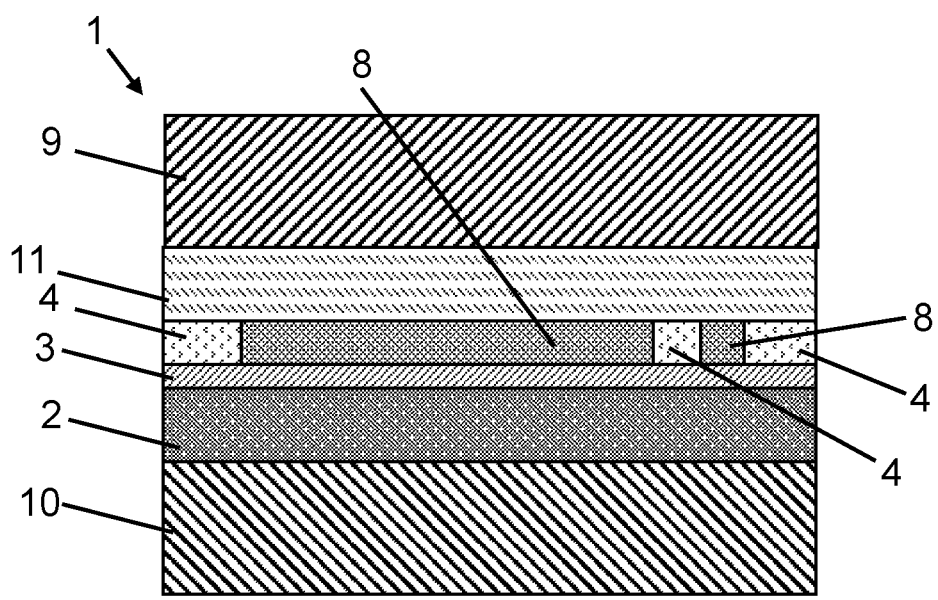

They depict:

FIG. 1 a cross-section through an embodiment of a preliminary composite for producing a composite pane by means of a method according to the invention, FIG. 2 a cross-section through an embodiment of a preliminary composite for producing a composite pane by means of a method according to the invention, FIG. 3 a cross-section through an embodiment of a preliminary composite with an aperture for producing a composite pane by means of a method according to the invention, FIG. 4 a cross-section through an embodiment of a layered stack for producing a composite pane by means of a method according to the invention, FIG. 5 a cross-section through an embodiment of a composite pane produced by means of a method according to the invention, FIG. 6 a cross-section through another embodiment of a composite pane produced by means of a method according to the invention, FIG. 7 an enlarged representation of the region Z of FIG. 6, FIG. 8 a cross-section through another embodiment of a composite pane produced by means of a method according to the invention, FIG. 9 a cross-section through an embodiment of a preliminary composite for producing a composite pane by means of a method according to the invention, FIG. 10 a cross-section through an embodiment of a preliminary composite for producing a composite pane by means of a method according to the invention, FIG. 11 a cross-section through an embodiment of a preliminary composite with an aperture for producing a composite pane by means of a method according to the invention, FIG. 12 a cross-section through another embodiment of a layered stack for producing a composite pane by means of a method according to the invention, FIG. 13 a cross-section through an embodiment of a composite pane produced by means of a method according to the invention, FIG. 14 plan view of an embodiment of a composite pane produced by means of a method according to the invention, FIG. 15 plan view of another embodiment of a composite pane produced by means of a method according to the invention, and FIG. 16 a cross-section through the composite pane depicted in FIG. 15.

FIG. 1 depicts a cross-section through an embodiment of a preliminary composite 5 for producing a composite pane 1 by means of a method according to the invention. The preliminary composite 5 depicted in FIG. 1 comprises a first thermoplastic intermediate layer 2, a second thermoplastic intermediate layer 3, and a third thermoplastic intermediate layer 4, wherein the second thermoplastic intermediate layer 3 is arranged between the first thermoplastic intermediate layer 2 and the third thermoplastic intermediate layer 4. For example, the first thermoplastic intermediate layer 2 is a PVB layer with a thickness of 0.76 mm and a plasticizer content of 40%; the second thermoplastic intermediate layer 3, a PVB layer with a thickness of 50 μm, which is plasticizer-free; and the third thermoplastic intermediate layer 4, a PVB layer with a thickness of 100 μm, which is plasticizer-free. The preliminary composite 5 depicted in cross-section in FIG. 1 was, for example, obtained by placing, one above the other, a first thermoplastic intermediate layer 2, a second thermoplastic intermediate layer 3, and a third thermoplastic intermediate layer 4 and subsequently heating them in a vacuum bag at 900 mbar and 90° C. for 20 minutes at negative pressure.

FIG. 2 depicts a cross-section through an embodiment of a preliminary composite 5 for producing a composite pane 1 by means of a method according to the invention. The preliminary composite 5 depicted in cross-section in FIG. 2 differs from that depicted in FIG. 1 only in that two dotted lines are used to indicate where, in the method according to the invention, the cuts in the third thermoplastic intermediate layer 4 are made to form an aperture.

FIG. 3 depicts a cross-section through an embodiment of a preliminary composite 5 with an aperture 6. The preliminary composite 5 depicted in cross-section in FIG. 3 differs from that depicted in FIG. 2 only in that it has an aperture 6 that was formed by removal of the third thermoplastic intermediate layer 4 in the regions located between the cuts.

FIG. 4 depicts a cross-section through an embodiment of a layered stack 7 for producing a composite pane 1 by means of a method according to the invention. The layered stack 7 depicted in cross-section in FIG. 4 comprises the preliminary composite 5 depicted in FIG. 3, wherein a functional element 8 is arranged in the aperture 6 in the third thermoplastic intermediate layer. In the embodiment depicted in FIG. 4, the functional element is, for example, an XIR film with a thickness of 100 μm. This comprises a PET carrier film with an infrared-radiation-reflecting coating. The functional element 8 implemented as an XIR film is, for example, arranged in the aperture 6 such that the infrared-radiation-reflecting coating is arranged directly adjacent the second thermoplastic layer 3. In this way, the coating is protected against damage.

FIG. 5 depicts a cross-section through an embodiment of a composite pane 1 produced by means of a method according to the invention. The composite pane 1 depicted in cross-section in FIG. 5 comprises the layered stack 7 depicted in FIG. 4 and a first pane 9 and a second pane 10, with the layered stack 7 arranged between the first pane 9 and the second pane 10. The first pane 9 and the second pane 10 are made, for example, of soda lime glass and have, for example, a thickness of 2.1 mm in each case.

FIG. 6 depicts a cross-section through another embodiment of a composite pane 1 produced by means of a method according to the invention; and in FIG. 7, the region Z of FIG. 6 is depicted enlarged. The composite pane 1 depicted in cross-section in FIG. 6 differs from that depicted in cross-section in FIG. 5 in that the functional element 8 has a thin layer 12 having adhesive and/or thermoplastic properties, which is implemented, for example, as a 20-μm-thick PVB film with a plasticizer content of 30%. The functional element without the thin layer 8a is, for example, 80-μm-thick, such that the functional element 8 has a total thickness of 100 μm. Thus, the functional element 8 in the embodiment of a composite pane 1 depicted in FIG. 6 comprises an XIR film with a thickness of 80 μm (provided in FIG. 7 with the reference character 8a) and a thin layer 12 implemented as a 20-μm-thick PVB film with a plasticizer content of 30%. The functional element 8 is arranged in the aperture in the third thermoplastic intermediate layer 4 such that, in the composite pane 1, the thin layer 12 having adhesive and/or thermoplastic properties is arranged not directly adjacent the second thermoplastic intermediate layer 3, but directly adjacent the first pane 9.

FIG. 8 depicts a cross-section through another embodiment of a composite pane 1 produced by means of a method according to the invention. The embodiment of a composite pane 1 depicted in FIG. 8 differs from the embodiment of a composite pane depicted in cross-section in FIG. 5 only in that the stack sequence 7 additionally has a layer 11 having adhesive and/or thermoplastic properties that is arranged in full surface contact directly adjacent the third thermoplastic intermediate layer 4 and the functional element 8 and directly adjacent the first pane 9. The layer 11 having adhesive and/or thermoplastic properties is, for example, a PVB layer with a thickness of 0.76 mm and a plasticizer content of 40%.

FIG. 9 depicts a cross-section through another embodiment of a preliminary composite 5 for producing a composite pane 1 by means of a method according to the invention. The preliminary composite 5 depicted in FIG. 9 comprises a first thermoplastic intermediate layer 2, a second thermoplastic intermediate layer 3, and a third thermoplastic intermediate layer 4, with the second thermoplastic intermediate layer 3 arranged between the first thermoplastic intermediate layer 2 and the third thermoplastic intermediate layer 4. For example, the first thermoplastic intermediate layer 2 is a PVB layer with a thickness of 0.76 mm and a plasticizer content of 40%; the second thermoplastic intermediate layer 3 is a PVB layer with a thickness of 50 μm, that is free of plasticizers; and the third thermoplastic intermediate layer 4 comprises two thermoplastic layers 14, i.e., a first thermoplastic layer 14a and a second thermoplastic layer 14b, with the first thermoplastic layer 14a arranged directly adjacent the second thermoplastic intermediate layer 3. The first thermoplastic layer 14a is, for example, a PVB layer with a thickness of 75 μm, which is free of plasticizers; and the second thermoplastic layer 14b, a PVB layer with a thickness of 75 μm that has a plasticizer content of 20%. The preliminary composite 5 depicted in cross-section in FIG. 9 was obtained, for example, by placing a first thermoplastic intermediate layer 2, a second thermoplastic intermediate layer 3, and a third thermoplastic intermediate layer 4 one above the other and subsequently heating them in a vacuum bag at 900 mbar and 80° C. for 10 minutes at negative pressure.

FIG. 10 depicts a cross-section through an embodiment of a preliminary composite 5 for producing a composite pane 1 by means of a method according to the invention. The preliminary composite 5 depicted in cross-section in FIG. 10 differs from that depicted in FIG. 9 only in that two dotted lines indicate where, in the method according to the invention, the cuts are made to form an aperture in the third thermoplastic intermediate layer 4.

FIG. 11 depicts a cross-section through an embodiment of a preliminary composite 5 with an aperture 6. The preliminary composite 5 depicted in cross-section in FIG. 11 differs from that depicted in FIG. 10 only in that it has an aperture 6 that was formed by removing the third thermoplastic intermediate layer 4 in the regions lying between the cuts.

FIG. 12 depicts a cross-section through an embodiment of a layered stack 7 for producing a composite pane 1 by means of a method according to the invention. The layered stack 7 depicted in cross-section in FIG. 12 comprises the preliminary composite 5 depicted in FIG. 11, wherein a functional element 8 is arranged in the aperture 6 in the third thermoplastic intermediate layer and a layer 11 having adhesive and/or thermoplastic properties is arranged in full surface contact on the third thermoplastic intermediate layer 4 and the functional element 8. The layer 11 having adhesive and/or thermoplastic properties is, for example, a 0.38-mm-thick PVB film with a plasticizer content of 30%. In the embodiment depicted in FIG. 12, the functional element is, for example, a film with a scattering effect in the form of a PET carrier film with a thickness of 150 with liquid crystals arranged on the surface.

FIG. 13 depicts a cross-section through an embodiment of a composite pane 1 produced by means of a method according to the invention. The composite pane 1 depicted in cross-section in FIG. 13 comprises the layered stack 7 depicted in FIG. 12 and a first pane 9 and a second pane 10, wherein the layered stack 7 is arranged between the first pane 9 and the second pane 10. The first pane 9 and the second pane 10 are made, for example, of soda lime glass and have, for example, in each case, a thickness of 2.1 mm.

FIG. 14 depicts a plan view of an embodiment of a composite pane 1 produced by means of a method according to the invention in the form of a windshield. This is, for example, a composite pane 1 as depicted in FIG. 6 or 8 in cross-section along the line X'-X. In FIG. 14, the dashed line depicts the outer outline of the functional element 8.

FIG. 15 depicts a plan view of another embodiment of a composite pane 1 produced by means of a method according to the invention in the form of a windshield, and FIG. 16 depicts a cross-section of this composite pane 1 along the line X'-X. The embodiment of a composite pane 1 depicted in FIGS. 15 and 16 differs from the embodiment depicted in FIG. 8 in that the functional element 8 has an aperture 13, for example, for a camera window. The aperture 6 in the third thermoplastic intermediate layer 4 is shaped in such a way that it does not include the aperture 13 in the functional element 8. In this way, after arranging the functional element 8 in the aperture 6 of the third thermoplastic intermediate layer 4, a part of the third thermoplastic intermediate layer 4 is arranged in the aperture 13 of the functional element 8.

LIST OF REFERENCE CHARACTERS 1 composite pane
2 first thermoplastic intermediate layer
3 second thermoplastic intermediate layer
4 third thermoplastic intermediate layer
5 preliminary composite
6 aperture
7 layered stack
8 functional element
8a functional element without thin layer
9 first pane
10 second pane
11 layer having adhesive and/or thermoplastic properties
12 thin layer having adhesive and/or thermoplastic properties
13 aperture
14 thermoplastic layer
14a first thermoplastic layer
14b second thermoplastic layer
Z region
X-X' line

The invention claimed is:

1. A method for producing a composite pane, comprising, in the order indicated below:
   a) arranging a first thermoplastic intermediate layer, a second thermoplastic intermediate layer, and a third thermoplastic intermediate layer in full surface contact one above the other;
   b) joining the first thermoplastic intermediate layer, the second thermoplastic intermediate layer, and the third thermoplastic intermediate layer to form a preliminary composite;
   c) removing the third thermoplastic intermediate layer from certain regions to form an aperture,
   d) forming a layered stack by inserting a functional element into the aperture in the third thermoplastic intermediate layer;
   e) arranging the layered stack between a first pane and a second pane;
   f) joining the first pane and the second pane by lamination via the layered stack;
   and wherein the functional element has a thickness of ≥50 µm, and the third thermoplastic intermediate layer has a thickness that substantially corresponds to the thickness of the functional element,
   and outer dimensions of the aperture substantially correspond to outer dimensions of the functional element.

2. The method according to claim 1, wherein step d) for forming the layered stack additionally comprises placing a layer having adhesive and/or thermoplastic properties in full surface contact on the functional element and the third thermoplastic intermediate layer.

3. The method according to claim 2, wherein the layer contains a thermoplastic polymer.

4. The method according to claim 3, wherein the thermoplastic polymer is polyvinyl butyral (PVB), ethylene vinyl acetate (EVA), and/or polyurethane (PU).

5. The method according to claim 1, wherein the functional element comprises a thin layer having adhesive and/or thermoplastic properties that forms a surface of the functional element, and the functional element is inserted into the aperture in the third thermoplastic intermediate layer such that the thin layer is not arranged directly adjacent the second thermoplastic intermediate layer.

6. The method according to claim 5, wherein the thin layer contains a thermoplastic polymer.

7. The method according to claim 6, wherein the thermoplastic polymer is polyvinyl butyral (PVB), ethylene vinyl acetate (EVA), and/or polyurethane (PU).

8. The method according to claim 1, wherein the third thermoplastic intermediate layer consists of at least two thermoplastic layers.

9. The method according to claim 8, wherein the first thermoplastic intermediate layer contains plasticizers, and the second thermoplastic intermediate layer and the thermoplastic layer of the third thermoplastic intermediate layer, which is arranged directly adjacent the second thermoplastic intermediate layer, contain, independently of one another, a lower proportion of plasticizers than the first thermoplastic intermediate layer or are free of plasticizers.

10. The method according to claim 8, wherein the third thermoplastic intermediate layer consists of exactly two thermoplastic layers.

11. The method according to claim 1, wherein the second thermoplastic intermediate layer has a thickness of 20 µm to 150 µm.

12. The method according to claim 11, wherein the second thermoplastic intermediate layer has a thickness of 30 µm to 90 µm.

13. The method according to claim 1, wherein the functional element has a thickness of 50 µm to 1.0 mm.

14. The method according to claim 13, wherein the functional element has a thickness of 50 µm to 300 µm.

15. The method according to claim 1, wherein the first thermoplastic intermediate layer, the second thermoplastic intermediate layer, and the third thermoplastic intermediate layer, independently of one another, contain a thermoplastic polymer.

16. The method according to claim 15, wherein the thermoplastic polymer is polyvinyl butyral (PVB), ethylene vinyl acetate (EVA), and/or polyurethane (PU).

17. The method according to claim 1, wherein the first thermoplastic intermediate layer contains plasticizers, and the second thermoplastic intermediate layer and the third thermoplastic intermediate layer contain, independently of one another, a lower proportion of plasticizers than the first thermoplastic intermediate layer or are free of plasticizers.

18. The method according to claim 1, wherein the functional element comprises a film that reflects in the infrared range, in the visible range, and/or in the UV range or a film that absorbs in the infrared range, in the visible range and/or in the UV range or a film with a scattering effect or a holographic HUD film or a controllable functional element, in particular a PDLC, an SPD, an LC, an electrochromic, or an electroluminescent functional element or is implemented as such a film or such a controllable functional element.

19. The method according to claim 1, wherein the joining of the first thermoplastic intermediate layer, the second thermoplastic intermediate layer, and the third thermoplastic intermediate layer to form a preliminary composite in step b) is done by deaeration in a vacuum bag under the action of temperature or by passing over heated rollers with subsequent pressing in a roller press.

20. The method according to claim 1, wherein the functional element has at least one aperture for a communication, sensor, and/or camera window.

21. The method according to claim 1, wherein an upper surface of the functional element is in direct contact with the first pane or the second pane, or both the first pane and the second pane are out of contact with the third thermoplastic intermediate layer.

\* \* \* \* \*